United States Patent
Takiyama et al.

[11] Patent Number: 5,254,643
[45] Date of Patent: Oct. 19, 1993

[54] HIGH-MOLECULAR UNSATURATED POLYESTER RESIN

[75] Inventors: Eiichiro Takiyama, Kamakura; Ryushi Ogura; Takao Hokari, both of Takasaki; Yositaka Hatano, Higasikanbaragun, all of Japan

[73] Assignee: Showa Highpolymer Co., Ltd., Tokyo, Japan

[21] Appl. No.: 850,815

[22] Filed: Mar. 13, 1992

[30] Foreign Application Priority Data

Mar. 15, 1991 [JP] Japan ................. 3-074238

[51] Int. Cl.$^5$ ............................................. C08F 20/00
[52] U.S. Cl. ................................. 525/445; 528/272; 528/279; 528/302; 528/303; 528/306; 528/308; 528/308.6; 525/437
[58] Field of Search ............ 528/272, 279, 302, 303, 528/306, 308, 308.6; 525/437, 445

[56] References Cited

U.S. PATENT DOCUMENTS 3,539,441  11/1970  Rabenold .................. 523/506
5,091,465  2/1992   Dana et al. ................ 524/588

FOREIGN PATENT DOCUMENTS 2147253  9/1972  France .
3-220232 9/1991  Japan .

Primary Examiner—Samuel A. Acquah
Attorney, Agent, or Firm—Sughrue, Mion, Zinn, Macpeak & Seas

[57] ABSTRACT

An unsaturated alkyd having a number-average molecular weight of at least 5000 obtained by esterification and then deglycolization reaction of (a) at least 10 mol % of an $\alpha,\beta$-unsaturated polybasic acid or an anhydride thereof relative to 100 mol % of the total polybasic acid including any saturated or non-$\alpha,\beta$-unsaturated polybasic acid (or anhydride thereof) and (b) at least 50 mol % of a polyhydroxy alcohol having a boiling point of 300° C. or less at 760 mmHg relative to 100 mol % of the total polyhydroxy alcohol summed up with another polyhydroxy alcohol not defined above. The polyester resin can be widely used in a various applications by employing the excellent physical properties thereof.

4 Claims, 4 Drawing Sheets

REACTION TIME OF HIGH-MOLECULAR SATURATED POLYESTER IN REDUCED PRESSURE AND DISTRIBUTION OF MOLECULAR WEIGHT

WEIGHT-AVERAGE MOLECULAR WEIGHT (Mw)

REACTION TIME OF HIGH-MOLECULAR UNSATURATED ALKYD IN REDUCED-PRESSURE AND DISTRIBUTION OF MOLECULAR WEIGHT

WEIGHT-AVERAGE MOLECULAR WEIGHT (Mw)

HIGH-MOLECULAR UNSATURATED POLYESTER RESIN

BACKGROUND OF THE INVENTION

1. Field of the Invention

The present invention relates to an unsaturated alkyd having a number-average molecular weight of at least 5000 and an unsaturated polyester resin obtained therefrom.

2. Description of the Related Art

It is generally known that an unsaturated alkyd obtained by esterifying, with polyhydroxy alcohols, an α,β-unsaturated polybasic acid or an anhydride thereof such as maleic anhydride or fumaric acid, which is used in combination with a saturated polybasic acid, an unsaturated alicyclic polybasic acid or an anhydride thereof is dissolved in a monomer compolymerizable with the alkyd to form an unsaturated polyester resin.

Such unsaturated polyester resins are used for fiber-reinforced plastics (FRP), paints, casting and the like in a very wide range, and the annual output of the polyester resins has exceeded 200,000 tons.

Although unsaturated polyester resins are very important in the industrial field, the number-average molecular weight of the unsaturated alkyd, which is an important property of the unsaturated polyester resins, is at most about 1000 to 2500, as is common in conventional thermosetting resins. It is not an overstatement to say that there is no alkyd having a molecular weight of at least 3000.

The reason for this is that gelation makes it impossible to obtain a number-average molecular weight of the above value or more by the conventional direct esterification method using a polybasic acid or anhydride thereof and a polyhydroxy alcohol.

In some cases, attempts may be made to employ a conventional deglycol reaction, i.e., reaction at a high temperature of 250° C. or more and a highly-reduced pressure of 1 mm Hg or less in the presence of a metal compound catalyst. Although the inventors attempted to synthesize a high-molecular unsaturated alkyd weight under the above conditions, the attempt was a failure because of inevitable gelation even when a large amount of polymerization inhibitors were added.

A thermosetting unsaturated alkyd cannot be synthesized under the general conditions for synthesis of thermoplastic polyesters. It is thus obvious that there is a fundamental difference between both types of polyesters, and there are no cases where synthesis of a high-molecular unsaturated alkyd is achieved by the above method.

For example, in the case of a thermoplastic polyester, the number-average molecular weight and weight-average molecular weight decrease after the optimum time under reaction conditions has passed, as shown in FIGS. 1 and 2. Namely, this indicates that decomposition reaction takes place. In the case of an unsaturated alkyd, the number-average molecular weight becomes constant at a value slightly lower than the highest value, as shown in FIG. 3. However, the weight-average molecular weight of the unsaturated alkyd steadily increases as shown in FIG. 4. This shows that crosslinking of the unsaturated alkyd takes place at the same time as decomposition thereof. It is clear from the above fact that the thermoplastic polyester and unsaturated alkyd are essentially different in reactions from each other.

SUMMARY OF THE INVENTION

As a result of various investigations performed by the inventors, a method of obtaining an unsaturated alkyd having a number-average molecular weight of at least 5000 was found.

In one aspect of the present invention, there is provided an unsaturated alkyd having a number-average molecular weight of at least 5000 obtained by esterification and then deglycol reaction of the following substances (a) and (b):

(a) at least 10 mol % of an α, β-unsaturated polybasic acid or an anhydride thereof relative to 100 mol % of the total polybasic acid including any saturated or non-α, β-unsaturated polybasic acid (or anhydride thereof);

(b) at least 50 mol % of a polyhydroxy alcohol having a boiling point of 300° C. or less at 760 mmHg relative to 100 mol % of the total polyhydroxy alcohol summed up with another polyhydroxy alcohol not defined above.

In another aspect of the present invention, there is provided an unsaturated polyester resin obtained by mixing the unsaturated alkyd obtained by the above method with a monomer copolymerizable therewith.

Particularly, the present invention provides an unsaturated alkyd having a number-average molecular weight of at least 5000 and synthesized by deglycolizing, under reduced pressure of 5 mmHg or less, hydroxy polyester having an acid value of 15 or less and a number-average molecular weight of at least 500 in the presence of the organic titanium compound catalyst added in an amount of at least 0.01 parts by weight relative to 100 parts by weight of hydroxy polyester. The hydroxy polyester is obtained by esterification of (a) any desired saturated or unsaturated polybasic acid or an anhydride thereof and an α,β-unsaturated polybasic acid or an anhydride thereof, which is contained as a component, and (b) polyhydroxy alcohols. The present invention is characterized in that the ratio of the α,β-unsaturated polybasic acid (or an anhydride thereof) used in the reaction is at least 10 mol %, preferably 10 to 99 mol % and more preferably 10 to 90 mol % relative to the total polybasic acid amount of 100 mol % and that a polyhydroxy alcohol is a polyhydroxy alcohol having a boiling point of 300° C. at 760 mmHg or less, which is contained in an amount of at least 50 mol %, preferably 50 to 99 mol %, more preferably 50 to 90 mol % relative to total polyhydroxy alcohol of 100 mol %.

The reason for limiting the amount of the α,β-unsaturated polybasic acid (or anhydride thereof) to at least 10 mol % is that if the amount is less than 10 mol %, physical properties, especially the mechanical properties of the cured resin significantly deteriorate, and the deterioration of curing properties makes it difficult to completely cure the resin.

The reason for limiting the amount of polyhydroxy alcohol having a boiling point of 300° C. or less at 760 mmHg to at least 50 mol % is that if the amount is less than 50 mol %, the likelihood of a deglycolization reaction occurring is lowered making polymerization difficult.

DETAILED DESCRIPTION OF THE INVENTION

Figure 1:
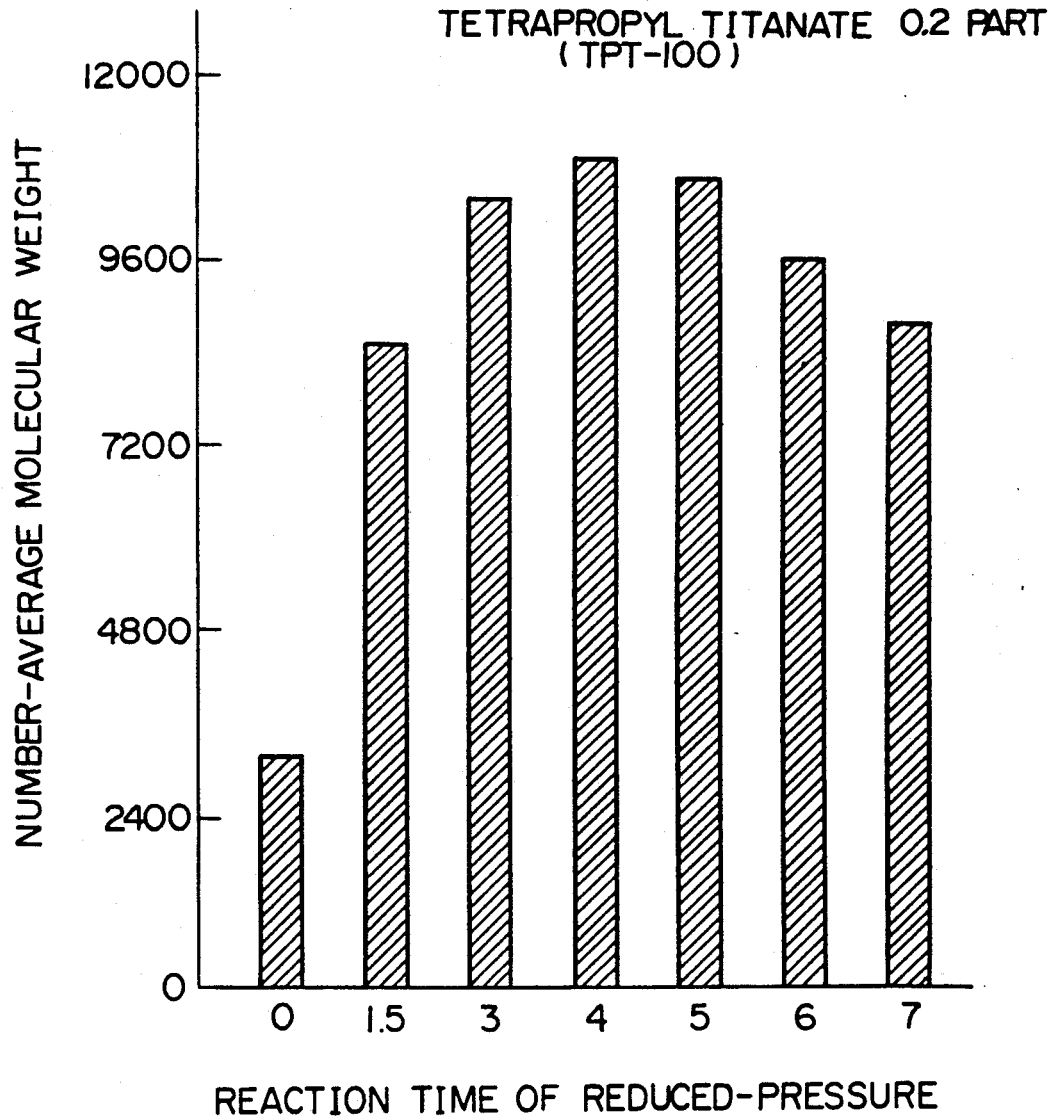
FIG. 1 shows a relation between the reduced-pressure reaction time and the number-average molecular weight distribution of a high-molecular saturated polyester.
Figure 2:
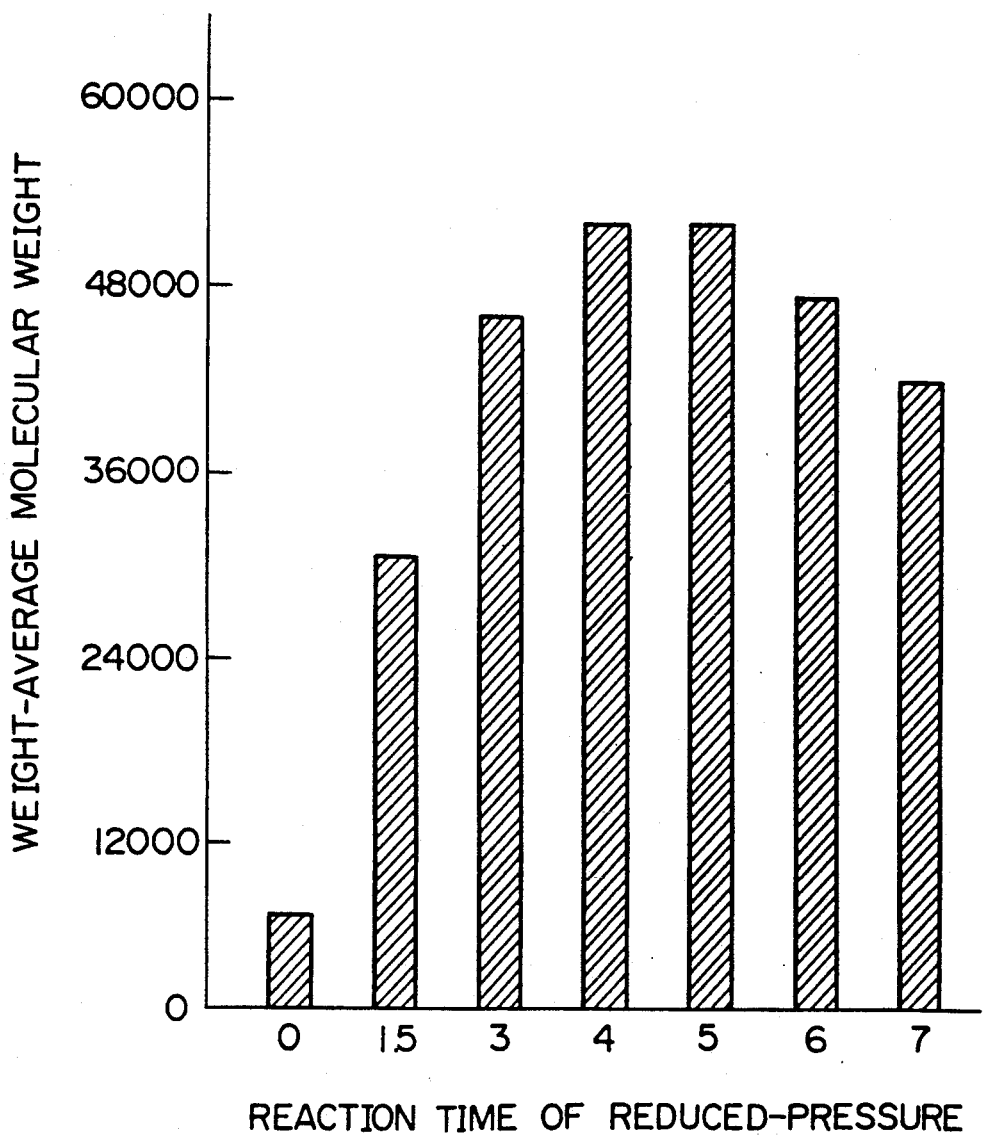
FIG. 2 shows a relation between the reduced-pressure reaction time and the weight-average molecular weight distribution of a high-molecular saturated polyester.
Figure 3:
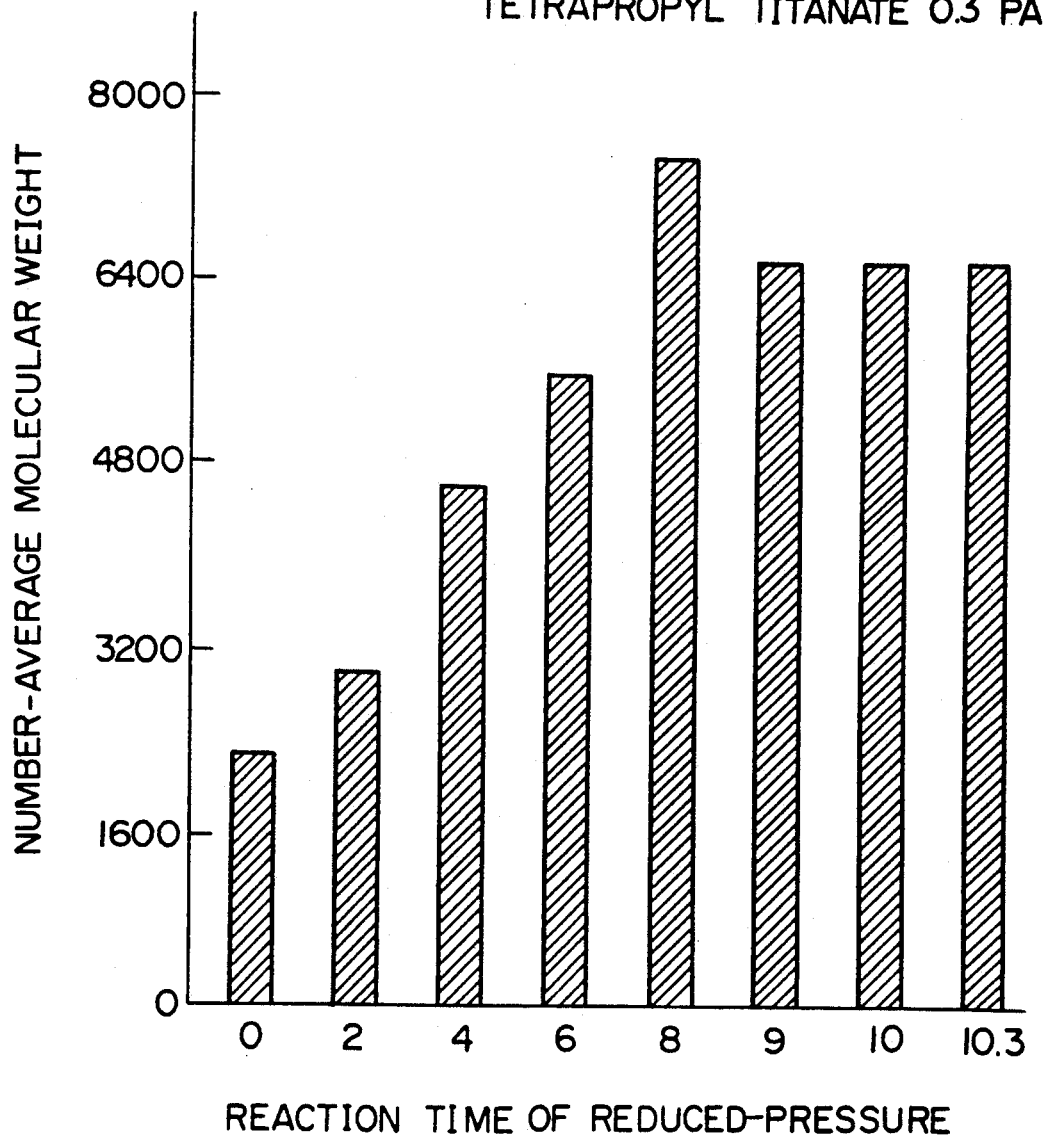
FIG. 3 shows a relation between the reduced-pressure reaction time and the number-average molecular weight distribution of a high-molecular unsaturated alkyd.
Figure 4:
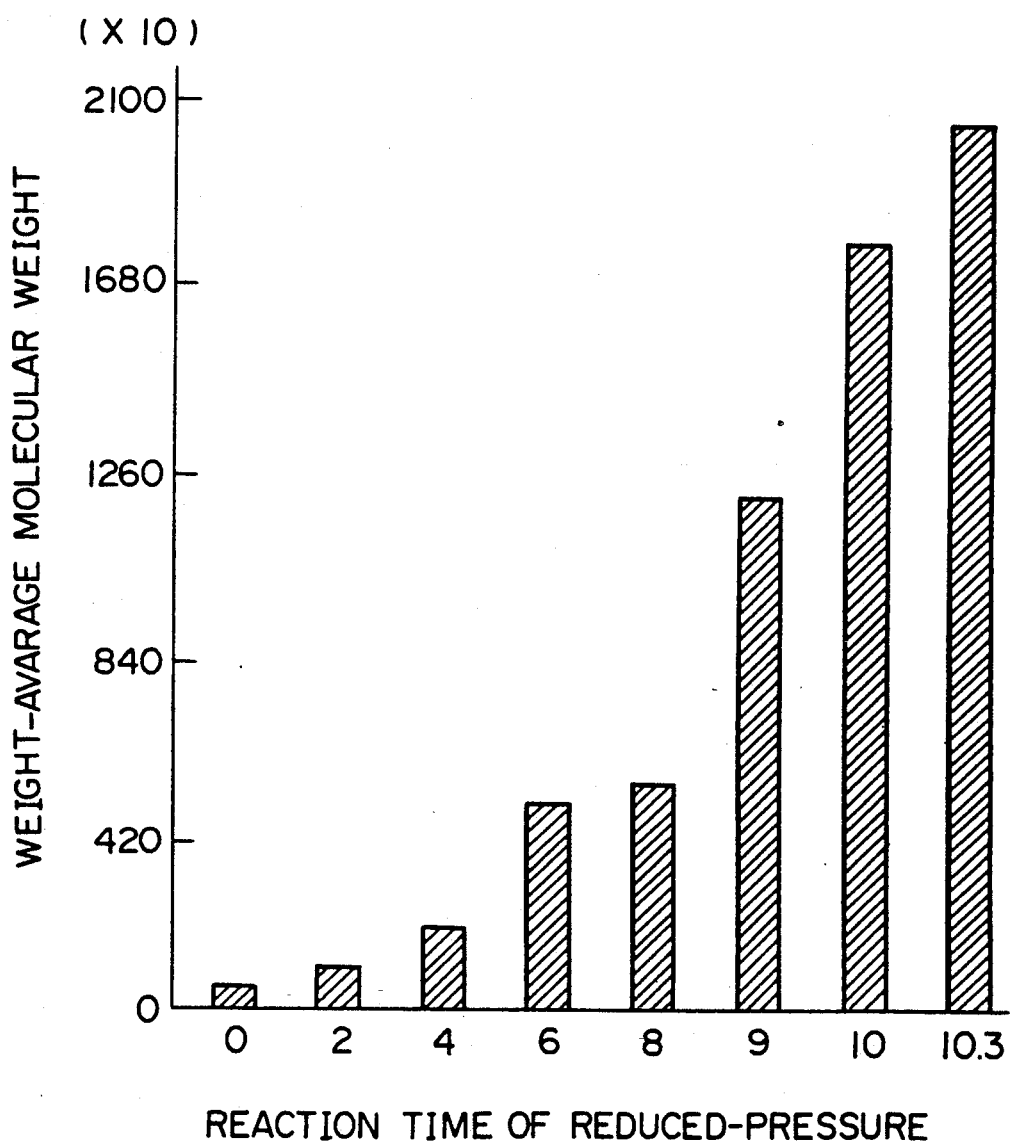
FIG. 4 shows a relation between the reduced-pressure reaction time and the weight-average molecular weight distribution of a high molecular unsaturated alkyd.

In the present invention, a glycol or alkylene monoepoxide having a boiling point of 300° C. or less at 760 mmHg is used as a polyhydroxy alcohol.

Any alkylene monoepoxide which forms an ester bond by addition reaction with a polybasic acid and which can be deglycolized at the terminal monoester groups under the conditions of the present invention can be used.

Examples of such glycols include ethylene glycol, propylene glycol, diethylene glycol, dipropylene glycol, 1,3-butanediol, 1,4-butanediol, neopentyl glycol, 1,5-pentanediol, 1,6-hexanediol. Furthermore, examples of the alkylene monoepoxide include ethyleneoxide, propyleneoxide, epichlorohydrin, phenyl glycidyl ether, allyl glycidyl ether and the like.

Another polyhydroxy alcohol which has a boiling point higher than 300° C. at 760 mmHg and cannot be easily subjected to glycol exchange can be used in an amount of 50 mol % or less. Examples of such polyhydroxy alcohols include hydrogenated bisphenol A, bisphenol A ethylene oxide addition products, bisphenol A propylene oxide addition products, glycerin diallyl ether, trimethylolpropane mono- or diallyl ether, nonamethylene glycol and the like.

The materials used as polybasic acids for synthesizing the high-molecular unsaturated alkyd of the present invention are the same as those used for conventional unsaturated alkyds.

Examples of such materials used as the polybasic acids include the following:

(A) α, β-unsaturated polybasic acids and anhydrides thereof such as maleic anhydride, fumaric acid, itaconic acid and the like; and (B) saturated or non-α, β-unsaturated polybasic acids each having a benzene nucleus, such as phthalic anhydride, isopthalic acid, terephthalic acid, dimethyl esters and the like; alicyclic polybasic acids and anhydrides thereof such as tetrahydrophtalic anhydride, methyltetrahydrophthalic anhydride, hexahydrophthalic anhydride, endomethylenetetrahydrophthalic anhydride, methylendomethylenetetrahydrophthalic anhydride, HET acid and the like; aliphatic dicarboxylic acids such as succinic acid, adipic acid, azelaic acid, sebacic acid and the like.

Examples of halogen acids include HET acid, tetrachlorophthalic anhydride, tetrabromophthalic anhydride and the like.

The synthesizes of the high-molecular unsaturated alkyd of the present invention is carried out by esterification in a first step and a deglycolization reaction in a second step.

The esterification in the first step is substantially performed by synthesizing hydroxy polyester having an acid value of 15 or less, preferably 10 or less, at at temperature of 160° to 230° C. in an inert gas flow according to normal methods.

As described above, the hydroxy polyester has a number-average molecular weight of at least 500 at this time.

The deglycolization reaction (ester exchange reaction) in the second step is performed at a highly reduced pressure of 5 mmHg or less, preferably 1 mmHg or less, in the presence of a catalyst.

If the acid value exceeds 15, the deglycolization reaction does not proceed sufficiently, and consequently the desired high-molecular unsaturated alkyd cannot be easily obtained. An organic titanium compound can be used as a catalyst. Examples of such organic titanium compounds include tetrabutyl titanate, tetrapropyl titanate and acetyl acetonate of titanium. The amount of the catalyst used is 0.01 to 0.5 parts by weight, preferably 0.1 to 0.3 parts by weight, relative to 100 parts by weight of hydroxy polyester.

Although styrene is a typical example of a monomer in which the unsaturated alkyd is dissolved to form unsaturated polyester resins, vinyl toluene, methyl methacrylate, diallyl phthalate, diallyl terephthalate or the like can be used as a monomer. The amount of the monomer added is generally 20 to 300 parts by weight, preferably 50 to 200 parts by weight, relative to 100 parts by weight of unsaturated alkyd.

The high-molecular unsaturated polyester resin of the present invention can be utilized in the field in which general unsaturated polyester resins are used. As a matter of course, fiber reinforcements, fillers, coloring agents, releasing agents and stabilizers can also be used.

EXAMPLES

Examples are described below for the sake of facilitating comprehension of the invention. In the examples, "parts" represents "parts by weight", unless otherwise noted.

EXAMPLES 1 TO 2 AND COMPARATIVE EXAMPLE 1

The substances below were charged in a 1l separable flask provided with an agitator, a fractionating condenser, a thermometer and a gas inlet tube.

Example 1
Neopentyl glycol 96 g (0.96 mol)
Bisphenol A propylene oxide addition product 82 g (about 0.24 mol)
(propylene oxide 1 mol)
Example 2
Neopentyl glycol 72 g (0.72 mol)
Bisphenol A propylene oxide addition product 163 g (about 0.48 mol)
(Propylene oxide 1 mol)
Comparative Example 1
Neopentyl glycol 48 g (0.48 mol)
Bisphenol A propylene oxide addition product 245 g (about 0.72 mol)
(Propylene oxide 1 mol)

To the flask 83 g of isophthalic acid was then added followed by esterification at a temperature of 200° to 210° C. in a flow of nitrogen. After the acid value was adjusted to 25 to 30, 58 g of fumaric acid was added, followed by further esterification. When the acid values of the reaction products of Example 1, 2, and Comparative Example 1 were 7.4, 8.9 and 9.7, respectively, 1 g of tetraisopropyl titanate and 0.2 g of hydroquinone were added to each of the reaction products. In the final step, a deglycol reaction was effected at a temperature of 210° to 215° C. and a reduced pressure of 0.8 mmHg for 4 hours.

The resultant unsaturated alkyds respectively had the following final number-average molecular weights. The measurement of the molecular weight was performed by GPC using a Shodex GPC SYSTEM-11 made by Showa Denko K. K. as follows:

Eluent: 5 mM $CF_3COONa$/HFIP (hexafluoroisopropanol)
Column temperature: 40° C.
Flow rate: 1.0 ml/min.
Detector: Shodex R1

| | Number - average molecular weight |
|---|---|
| Unsaturated alkyd of Example 1 | 6900 |
| Unsaturated alkyd of Example 2 | 5800 |
| Unsaturated alkyd of Comparative Example 1 | 3300 |

It is clear from the results that at least 50 mol % of the polyhydroxy alcohol having a boiling point of 300° C./760 mmHg or less must be used for obtaining a number-average molecular weight of at least 5000.

EXAMPLE 3 AND COMPARATIVE EXAMPLE 2

In Example 3, 48 g (0.3 mol) of nonamethylene glycol (boiling point 150° to 151° C./8 mmHg), 81 g (0.9 mol) of 1,3-butanediol and 83 g of isophthalic acid were charged in a 3 l separable flask provided with an agitator, a fractionating condenser, a thermometer and a gas inlet tube. Esterification was then effected at 190° to 200° C. in a flow of nitrogen gas. After the acid value was adjusted to 22:1, 34 g of adipic acid and 20 g of maleic anhydride were added to the flask, followed by further esterification. When the acid value was 9.1, the condenser was replaced by a new condenser, and 0.08 g of hydroquinone and 0.6 g of tetraisopropyl titanate were added. Deglycolization was then performed at 210° to 215° C. at pressure which was finally reduced to 0.8 mmHg.

In Comparative Example 2, 144 g (0.9 mol) of nonamethylene glycol, 27 g (0.3 mol) of 1,3-butanediol and 83 g of isophthalic acid were charged in the same flask as that used in Example 3 followed by esterification by the same method as in Example 3. After the acid value was adjusted to 19.6, 34 g of adipic acid and 20 g of maleic anhydride were added to the flask, followed by further esterification. When the acid value was 8.8, 0.03 g of hydroquinone and 0.5 g of tetraisopropyl titanate were added in the same way as Example 3. Deglycolization was performed at a pressure which was finally reduced to 0.8 mmHg.

The final number-average molecular weights of the unsaturated alkyds obtained in the examples were as described below. The number-average molecular weight of the unsaturated alkyd formed by using at least 50 mol % of nonamethylene glycol was less than 5000.

| | Number - average molecular weight |
|---|---|
| Unsaturated alkyd of Example 3 | about 6900 |
| Unsaturated alkyd of Comparative Example 2 | about 4200 |

The present invention constituted as described above thus can provide a novel high-molecular unsaturated alkyd which cannot be obtained by conventional methods and an unsaturated polyester resin which contains a monomer copolymerizable with the unsaturated alkyd. The unsaturated polyester resin can thus be widely used in a various applications by employing the excellent physical properties thereof.

What is claimed is:

1. An unsaturated alkyd having a number-average molecular weight of at least 5,000 obtained by esterification and then deglycolization reaction under highly reduced pressure of the following substances (a) and (b):
   (a) at least 10 mol % of an $\alpha, \beta$-unsaturated polybasic acid or an anhydride thereof relative to 100 mol % of the total polybasic acid, including any saturated or non-$\alpha, \beta$-unsaturated polybasic acid (or anhydride thereof); and
   (b) a mixture solution comprising 50–99 mol % of a polyhydroxy alcohol having a boiling point of 300° C. or less at 760 mm Hg and 1–50 mol % of a polyhydroxy alcohol selected from the group consisting of hydrogenated bisphenol A, bisphenol A ethylene oxide addition products, bisphenol A propylene oxide addition products, glycerin diallyl ether, trimethylolpropane mono or diallyl ether, and nonamethylene glycol.

2. An unsaturated polyester resin comprising 100 parts by weight of the unsaturated alkyd of claim 1 and 20 to 300 parts by weight of a monomer selected from the group consisting of styrene, vinyl toluene, methyl methacrylate, diallyl phthalate, and diallyl terephthalate.

3. A method for producing an unsaturated alkyd having a number-average molecular weight of at least 5,000 comprising esterifying and then deglycolizing under highly reduced pressure:
   (a) at least 10 mol % of an $\alpha, \beta$-unsaturated polybasic acid or an anhydride thereof relative to 100 mol % of the total polybasic acid, including any saturated or non-$\alpha, \beta$-unsaturated polybasic acid (or anhydride thereof); and
   (b) a mixture comprising 1–99 mol % of a polyhydroxy alcohol having a boiling point of 300° C. or less at 760 mm Hg and 1–50 mol % of a polyhydroxy alcohol selected from the group consisting of hydrogenated bisphenol A, bisphenol A ethylene oxide addition products, bisphenol A propylene oxide addition products, glycerin diallyl ether, trimethylolpropane mono or diallyl ether, and nonamethylene glycol.

4. A method for producing an unsaturated alkyd having a number-average molecular weight of at least 5,000 comprising:
   (1) esterifying
      (a) at least 10 mol % of an $\alpha, \beta$-unsaturated polybasic acid or an anhydride thereof relative to 100 mol % of the total polybasic acid, including any saturated or non-$\alpha, \beta$-unsaturated polybasic acid (or anhydride thereof) and
      (b) a mixture comprising 1–99 mol % of a polyhydroxy alcohol having a boiling point of 300° C. or less at 760 mm Hg and 1–50 mol % of a polyhydroxy alcohol selected from the group consisting of hydrogenated bisphenol A, bisphenol A ethylene oxide addition products, bisphenol A propylene oxide addition products, glycerin diallyl ether, trimethylolpropane mono or diallyl ether, and nonamethylene glycol,
(2) then yielding a hydroxy polyester having an acid value of 15 or less and a number-average molecular weight of at least 500,
(3) then adding 0.01 to 0.5 part by weight of an organic titanium compound relative to 100 parts by weight of said hydroxy polyester thereto, and
(4) then deglycolizing under a reduced pressure of 5 mm Hg or less.

* * * * *